United States Patent [19]

Manduley et al.

[11] Patent Number: 5,079,714
[45] Date of Patent: Jan. 7, 1992

[54] MAIL DELIVERABILITY BY MAIL AND DATABASE PROCESSING

[75] Inventors: Flavio M. Manduley, Woodbury; Ronald P. Sansone, Weston, both of Conn.

[73] Assignee: Pitney Bowes Inc., Stamford, Conn.

[21] Appl. No.: 416,736

[22] Filed: Oct. 3, 1989

[51] Int. Cl.⁵ .............................................. G06F 15/21
[52] U.S. Cl. .................................. 364/478; 364/401; 364/464.02
[58] Field of Search ............... 364/478, 400, 401, 402, 364/464.01, 464.02, 466, 464.03, 200, 900; 235/375

[56] References Cited

U.S. PATENT DOCUMENTS

| | | | |
|---|---|---|---|
| 4,797,830 | 1/1989 | Baggarly et al. | 364/464.03 |
| 4,853,882 | 8/1989 | Marshall | 235/375 X |
| 4,937,742 | 6/1990 | Marshall | 364/401 |

Primary Examiner—Joseph Ruggiero
Attorney, Agent, or Firm—Peter Vrahotes; Melvin J. Scolnick; David E. Pitchenik

[57] ABSTRACT

A system and process for improving mail deliverability by pre-processing and subjecting mail batches to one or more parameter tests involving addressing and content. A report is generated categorizing the mail in accordance with its deliverability and the degree of difficulty of its deliverability for use by a Postal System or a mailer. Databases can then by updated to increase the percentage of deliverable mail.

11 Claims, 5 Drawing Sheets

MAIL DELIVERABILITY BY MAIL AND DATABASE PROCESSING

This invention relates to methods and apparatus for improving the deliverability of mail.

RELATED APPLICATIONS

U.S. application, Ser. No. 234,977, now U.S. Pat. No. 5,005,124 filed Aug. 23, 1988, entitled "Method And Apparatus For Categorizing And Certifying Mail".

U.S. application, Ser. No. 285,145, filed Dec. 16, 1988, entitled "Up/Down Loading of Databases".

BACKGROUND OF INVENTION

The related, commonly-assigned application, Ser. No. 234,977, describes various schemes for pre-processing mail, before delivery to the Post Office, to assist the Post Office in handling, processing, and delivery of mail. The underlying concept is work-sharing. The mailer in exchange for postage discounts would guarantee to the Post Office that the mail delivered to it would comply with Post Office regulations regarding acceptability. The system there described emphasizes batch mailings and pre-processing by a sampling technique to determine various parameters of the mail batch, such as size, address readability, font type, correct postage, and deliverability. The output from the pre-processing is a report to the Post Office which categorizes the batch and certifies to the batch content and its compliance with Postal regulations. The Post Office can then rely on this report to eliminate its own acceptance procedures for this batch, and to schedule processing to conform to the batch contents.

The related, commonly-assigned application, Ser. No. 285,145, describes another invention adapted to increase the number of deliverables for mailers. The problem addressed in this case is the accuracy of a mailing list maintained by the mailer, and used to address its mailings. The invention of that case is to provide a centralized data facility, which maintains databases of information useful to mailers, and which is connected by a communications link to a data facility at the mailer. For instance, one of the databases maintained at the central facility is a master database of customer names and addresses, and the central facility possesses the resources to continuously update or sanitize, as it is sometimes called, such databases. The mailer therefore need not maintain its own sanitizing facility, and need merely update its own customer list by downloading from the central facility a copy of its updated master list. However, this is an expensive and time-consuming task, and may not be necessary if the master list has not undergone much change.

SUMMARY OF THE INVENTION

An object of the invention is to extend the deliverability concept to improve mail processing.

A further object of the invention is a system for alerting a mailer to the need to update his address lists.

The invention is based upon the novel concepts of determining deliverability of mail based on a number of different parameters including the concept of the degree of difficulty in delivering mail to the correct addressee. The parameters checked include one or more of the following items:

1. Incorrect name of addressee,
2. Incorrect address,
3. Absence of house address,
4. Absence of zip code,
5. Absence of zip plus four code,
6. Discrepancy between city/state and zip code,
7. Incorrect mailing weight,
8. Incorrect or illegal material content,
9. Readability of addressee information,
10. Size of the mail package or item.

In accordance with one aspect of the invention, the above parameters are determined by pre-processing of the mail before actual introduction into the postal system. The invention is mainly applicable to batch or mass mailings by a mailer, and the batch can be pre-processed on a sampling basis as described in the related application, Ser. No. 234,977, or each mail piece individually pre-processed. The result of the pre-processing in accordance with another aspect of the invention is a report categorizing the mail in accordance with its deliverability and the degree of difficulty of its deliverability. In a preferred embodiment, the percentage of deliverable vs. non-deliverable addresses is determined for the batch and included in the report. This information can be used in one or both of two ways. In the first way, the percentage of deliverables can be used by the Postal System to determine a postage discount to which the mailer is entitled. For example, 98% of deliverables may entitle the mailer to a 20% discount, 95% of deliverables to a 10% discount, 85% of deliverables to 5% discount, and so on. In the second way, the percentage of deliverables is used to determine the time when the mailer needs to update or upgrade his mailing list. In other words, when the percentage of deliverables drops below a threshold value, say, 97%, then the system alerts the mailer to the need to update his mailing list by downloading from the central data facility its current database of customer addresses for that particular mailer. In an alternative mode, the downloading occurs automatically when the threshold value is reached.

An important factor of the database maintained by the mailer is the weight of individual items included in each mail piece. Frequently, in order to avoid individual weighing of each mail piece that may include a number of different items, such as sheet advertisements for particular products, a computer-controlled insertion machine will know the weight of the envelope and the weight of each item inserted in an envelope. Thus, the stuffed mail piece need not be weighed since the weight can be readily calculated by the computer from a database that contains the weight of each insertion. It is therefore important to the mailer that the database of item weights is accurate. An accuracy to, for example, 1/32 oz (a common Postal requirement) is important to ensure that the stuffed envelope is not overweight for the applied postage. The deliverability analysis can take this into account. Should the analysis show a pattern of underpostage in an automatic insertion environment, then clearly something in the database is in error, either the weight of old items or the presence of new items. Again, this is a matter more easily maintained at the central data facility, since various mailers may be using the same inserts in their mail pieces. The solution, again, is to update the local database to avoid problems.

SUMMARY OF DRAWINGS

The invention will now be described in greater detail with respect to several exemplary embodiments, reference being had to the accompanying drawings wherein.

DETAILED DESCRIPTION OF THE PREFERRED EMBODIMENT

To assist those in understanding the present invention, it will be helpful to include a description of the categorizing and certifying mail system described in said related application, Ser. No. 234,977.

Figure 1:
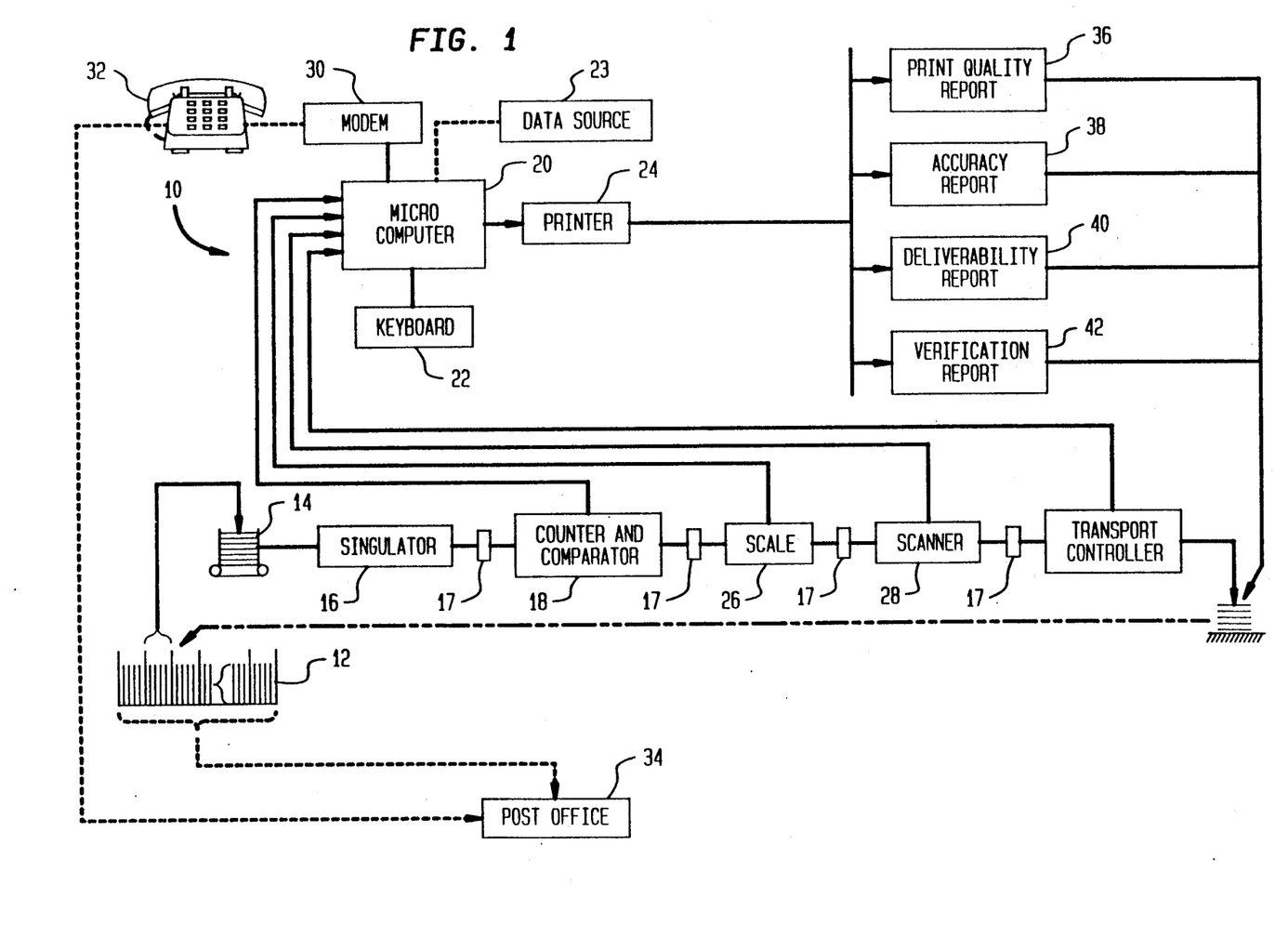
FIG. 1 is a block diagram showing the various components of a mail certification system.

Referring now to FIG. 1, when a batch of mail is to be certified and categorized, the batch of mail is delivered to a location that carries out this function. The location may be at the Post Office, upon the premises of the mailer and operated by the mailer, or it may be at the location of an independent contractor who performs the service on behalf of both the mailer and the Post Office. A batch of mail, indicated at 12, may include a large number of mail pieces, as for example 20,000 mail pieces. A statistically determined random sample is made of the mail pieces for the purposes of sampling the batch of mail 12 and such sampled mail is isolated into a packet indicated by 14. The statistical method of sampling can be any standard procedure such as the random number tables given in the Handbook of Military Standards. By way of an example, if the batch 12 consist of 20,000 mail pieces, the packet 14 may conveniently consist of 1800 mail pieces. Such a number would give a good statistical representation of the entire batch. It will be appreciated that a statement sheet prepared by the mailer, such as a Post Office 3602 form, will accompany the batch 12. This statement sheet would disclose the volume of mail, the various classes within the mail, the different levels of pre-sort and carrier routes, the total weight of the mail, and the rates. This statement sheet will then become part of the data that will subsequently be submitted to the Post Office. It should be noted that provision has been made to return the mail pieces of the sample to their original position in the batch 12 after categorizing and certification is complete.

The mail pieces that are part of the sample packet 14 are initially passed through a singulator 16 that will transport the mail pieces in series for further processing along a conveyor 17, such as a belt conveyor, represented by the small blocks between components. These mail pieces will be passed by a counter and comparator 18. At the counter and comparator 18 an ordinal number will be assigned to each mail piece consecutive order, and these numbers will be stored within a microcomputer 20 which is in communication with the counter and comparator so as to identify each mail piece individually. This will allow the system to track each mail piece as it is processed. The micro-computer 20 will have a data base that stores an address reference file that includes the national zip plus 4 lists and associated address correlation data. The counter comparator 18 will measure the package dimensions to determine if any mail pieces fall outside the categories that are set by the Post Office for such mail. If they are outside of the category set by the Post Office, this dimensional non-compliance will be transmitted to the microcomputer and stored in a non-compliance list. The microcomputer 20 has a keyboard 22 therein by which data may be input. For example, the class of mail for the batch of mail 12 may be input and in assigning ordinal numbers to the mail pieces, a particular sequence of numbers may be input by the keyboard. More importantly, data from a statement sheet for the batch of mail 12, such as a form 3602 or form 3541, will be entered through the keyboard 22. Alternatively, such statement sheet data can be entered from an outside source 23 such as the mailer's mainframe computer. A printer 24 is in communication with the microcomputer 20 so as to print reports which will hereinafter be described.

After a mail piece leaves the counter and comparator 18, it will be transported to a scale 26 which is in electrical communication with the microcomputer 20. The scale should be of a type that is able to weigh a mail piece rapidly and accurately. An example of such a scale is shown and described in U.S. Pat. No. 4,778,018, which is assigned to the assignee of the instant patent application. After the weight is obtained, the weight is transmitted to the microcomputer 20 and the mail is then forwarded to a scanner 28. The latter will identify and read the last line of the address block, which gives the city, state and zip code, and measure certain parameters of the mail piece such as print contrast, surface reflectivity, and print font style. The scanner 28 in combination with the microcomputer 20 will perform a number of functions. Firstly, the geographical distribution of the mail will be determined. This will allow the Post Office to be aware of which regional centers the mail is to be sent. The combination will also determine the accuracy of the zip or the zip +4 addressing. The lettering used to address the mail piece will be determined, i.e. the type of font used. This is useful information to the Post Office since some OCR machines are more capable of reading one type of font as opposed to a different type. The readability of the mailing address will be determined based upon the contrast and reflectivity of the mail pieces. This information will be sent to the microcomputer and stored in memory. The mail pieces will then be passed on to the transport controller whereby the mail pieces eventually will join the batch mail 12, being replaced in their original position. While such transporting is going on, certain activities are undertaken by microprocessor. The zip codes that are determined from the mail will be compared against the national zip +4 data base and retrieved. If the zip code is not found, an indication as such is stored as undeliverable for bad zip code. In the alternative, one can compare the zip coded city and state to the written city and state address, and if there are any mismatches, it is recorded as being undeliverable. If the mail is pre-barcoded, the bar code is decoded and compared to the zip code. If there is a mismatch, again it is marked as undeliverable. If manifest mail is being processed, an accuracy analysis is made of the manifest key line.

At the end of the batch sampling plan, an OCR readability mail compliance and deliverability summary from the sampled data is prepared. Then a comparison is made between the data represented by the statement sheets and that obtained from the sample. The amount of correlation is then stored.

After the microcomputer has been uploaded with the data from the various units, it will correlate the data and cause the printer 24 to print a print quality report 36, an accuracy report 38, a deliverability report 40, and a verification report 42. The print quality report will not only indicate the quality of the printing, but the type of font used as well. The accuracy report correlates the findings of the sample to the data on the statement sheet. The deliverability report will indicated the percentage of the mail being received by the Post Office that will actually be in a condition to be delivered. The verification report will then verify the postage paid for the batch of mail.

Upon the various parameters being determined, the microcomputer will then contact the Post Office through a telephone or fax 32 that is in communication with a computer through a modem 30 when the sampling takes place away from the Post Office. Obviously, if the sampling takes place at the Post Office the reports will be on site. Upon receipt of this information by the Post Office, the Post Office will now have the ability to determine the correctness of the postage paid, forecast workloads and can accommodate its equipment and manpower based upon such a forecast.

After all the data has been accumulated on the sample mail pieces, the transport control then causes the sample mail to be returned to the batch 12 and redistributed into the same locations from which the mail pieces were taken. Along with such sampled mail pieces, the print quality report 36, accuracy report 38, delivery report 40, and verification report 42 will also be placed with the batch 12. Although these reports 36, 38, 40, 42 are shown separately, it will be appreciated that the information from each can be placed on a single sheet to form a single report. Upon completion of the reinsertion of the sampled mail pieces and the various reports, the batch mail 12 will then be delivered to the Post Office along with the reports if sampling is performed outside of the Post Office. As stated previously, by the time the batch mail 12 reaches the Post Office, the Post Office will be in a position whereby it will have a good idea as to how to handle the mail, and have a certification report upon which the Post Office can rely to assure the payment accompanying the mail is correct without having to conduct manual acceptance procedures. If the payment is not correct, the Post Office can either collect for a postage shortage or the mailer's account can be debited by the microcomputer 20 for such postage due.

Figure 2:
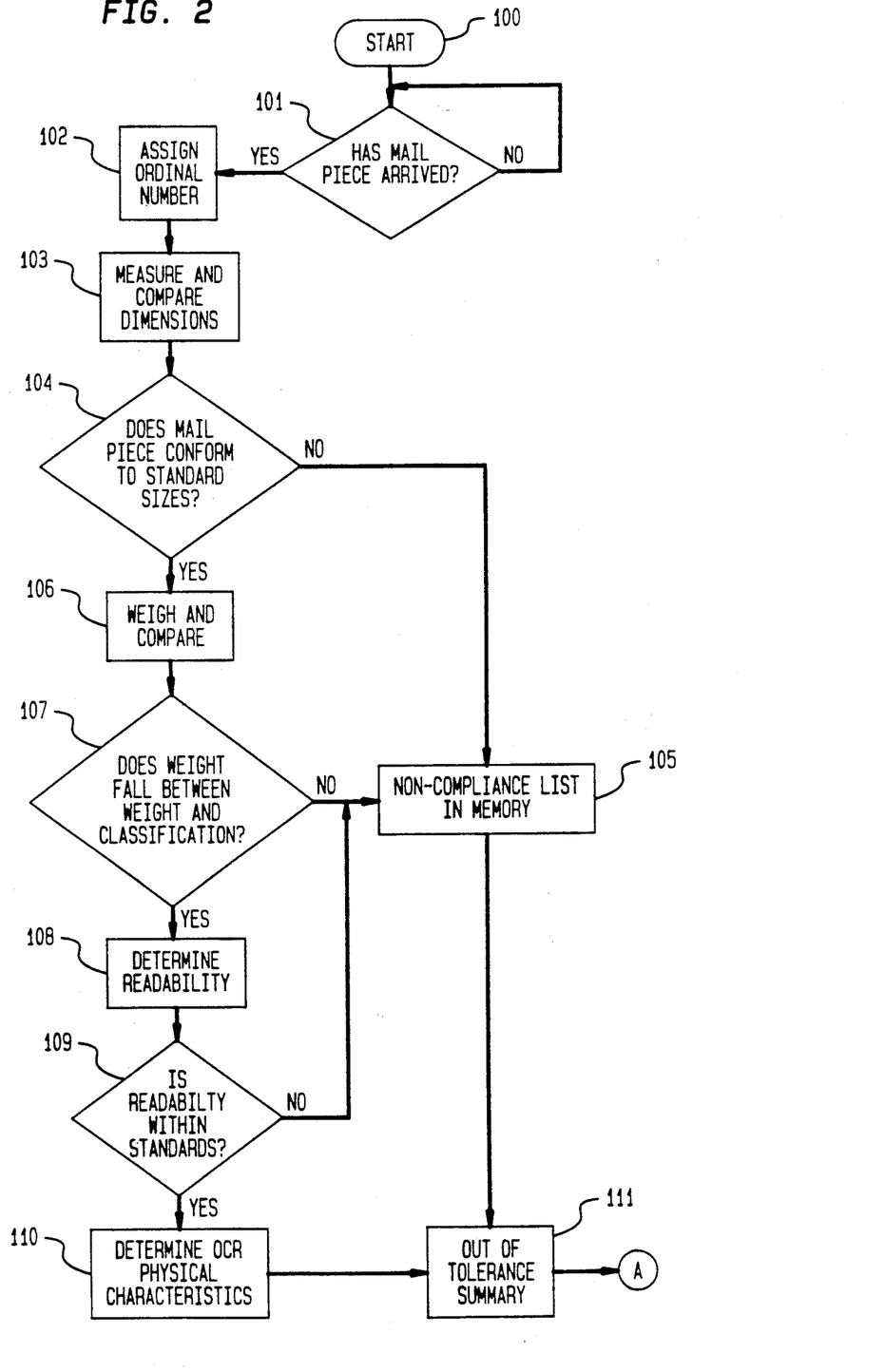
FIGS. 2-4 are flow charts that reflect the programs that control the functions of the components shown in FIG. 1.
Figure 3:
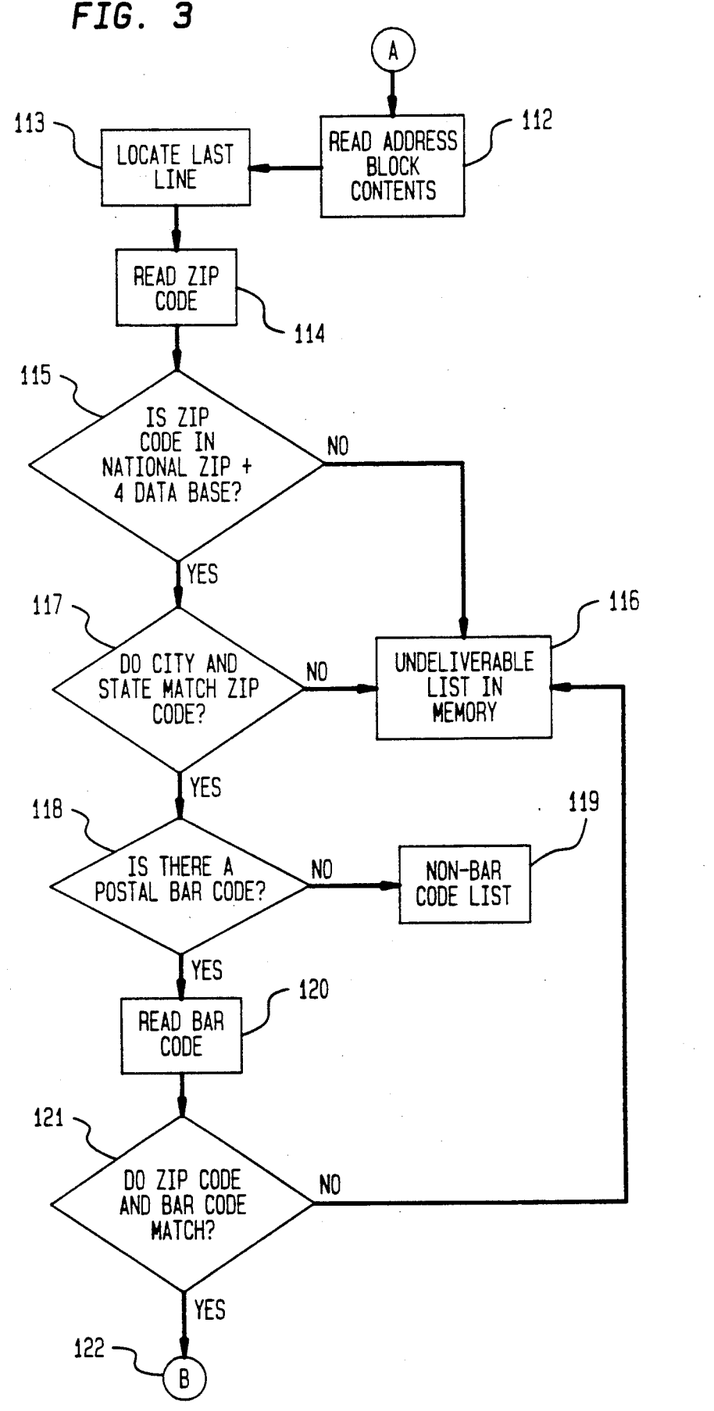
Figure 4:
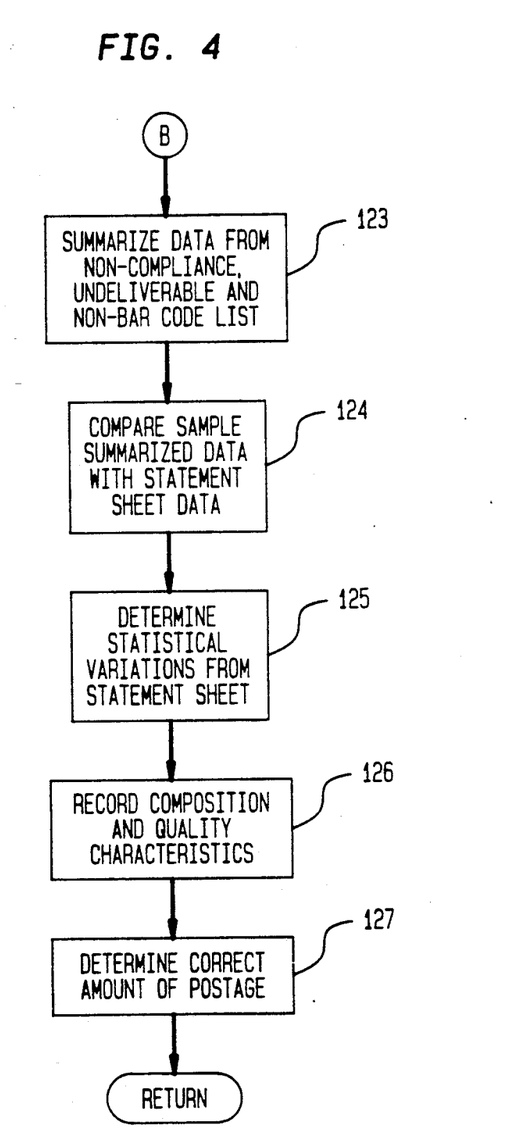

Referring now to FIGS. 2-4, a detailed description of the program that controls the functioning of the components shown in FIG. 1 will be given. Referring initially to FIG. 2, at the start 100 an inquiry 101 is made whether a mail piece has arrived at the singulator 16. If the mail piece has not arrived, there is a return, but if it has, a ordinal number 102 is assigned that uniquely identifies each piece. These ordinal numbers are assigned in sequence in order to monitor or track each of the mail pieces. The size of each mail piece is then measured, and the dimensions are compared 103 against the postal classification for dimensions. An inquiry 104 is then made whether the mail piece conforms to the standard sizes. If the response is no, these dimensions, as well as the ordinal number of the particular mail piece, are delivered to a memory list 105 within the microcomputer's memory. After the determination, if the piece is within the standard sizes allowed by the post Office, the piece is then weighed and compared 106 against the postal mail classification for that type of mail. The type of mail will have been input by the operator through the keyboard or through the outside data source input 23. The inquiry 107 is then made whether the weight falls within the postal classification. If not, then the weight and ordinal number of that particular mail piece is again stored within the memory list 105 for weights within the microcomputer. After the standard weight classification test, then a determination of readability 108 is made. An inquiry 109 is then made whether the mail piece is within OCR readability standards. Again, if it is not within the standards, this is recorded within the memory list 105 of the microprocessor. The mail piece is then passed on. A determination 110 is then made relative to the optical character reading physical characteristics of the address block. More specifically, determination is made as to the contrast, the reflectivity, the print font types, and the like. Upon completion of the determination of the OCR characteristics, then an out of tolerance summary 111 of the mail batch is made, and the percent of non-compliance of the mail pieces is stored in memory 105. It will be noted that one mail piece may have more than one parameter for which it is out of compliance, but because of the notation of the ordinal number for each mail piece, the total number of mail pieces out of compliance will be reported. This portion of the program completes the compliance for categorization.

The next part of the program is disclosed in FIG. 3 and deals with the mail batch deliverability and certification. The address block contents are first read 112. The last line of the address block is located 113, the last line being that line which has the city, state, and zip code. The zip code is then read 114. An inquiry 115 is made whether the zip code can be found in the national zip +4 data base. If it cannot, then this is stored in the undeliverable memory list 116 within the microprocessor. An inquiry 117 is then made as the whether the city and state match the zip code that is printed on the address line. If not, again this non-compliance is sent to the memory 116 list. The next inquiry 118 is whether there is a pre-printed postal bar code on the envelope. If not, this information is sent to the microprocessor 119 so that the postal service may charge the mailer for not having such pre-printed bar code, but if there is, the pre-printed bar code is read 120. An inquiry 121 is made as to whether the zip code and bar code match. If not, this is stored within memory 116, but if so, then the mail piece is simply forwarded 122.

After all the information has been obtained from the mail pieces, the summarization of such data takes place as is described in FIG. 4. A summarization 123 is first made as to the mail category with regard to compliance with sizes, class of mail, weights and the like in conjunction with the non-compliance lists 105, 116, and 119. After this summarization is made, a comparison 124 is made with the summary data on the statement sheet that accompanies the batch of mail and which had been entered into the microcomputer 20 through the keyboard 22 by the operator or outside source 23. A determination 125 is then made of the variation from the statement sheet. Following this, a quality characteristics report 126 is made which includes such things as readability. After such report is made, a determination is made as to the correct amount of postage. As indicated, the amount of postage 127 will be determined as to whether there are OCR readable address blocks, zip codes, wrong weight for statistical class, outsized and the like. This information will then be included in the report 129 that is prepared following the completion of the summarization.

It is understood that the invention is not limited to measuring the parameters above described in detail, but can also be applied to others. An example of another important parameter is the content of the mail piece. In many system, Postal regulations prohibit the transfer through the postal system of parcels or packages containing material having unacceptable properties or characteristics, such as magnetic material, or containing illegal material, such as radioactive or explosive material. In other instances, the mail pieces are delivered under a particular permit which does not allow certain material content. A suitable sensor for such incorrect or unacceptable or illegal postal contents is readily added to the system depicted in FIG. 1 in order to detect and record their presence for inclusion in a report, or for rejection from the batch. Rejection is particularly appropriate where each individual mail piece of the batch is processed rather than just sampled. Implementation of the latter is readily accomplished by adding, for example, a decision block in FIG. 2 after a test for the incorrect or illegal material content, and then in the event the test fails—meaning incorrect or illegal content has been detected—not only is a record made in the non-compliance list in memory, but in addition the particular item or parcel or other mail piece is physically rejected, such as by ejecting same from the belt conveyor into a separate bin for rejects. This rejection concept can also be applied with respect to mail pieces that fail other parameter compliance tests, again, in particular, where each mail piece is individually processed. Where rejection is implemented, then the report of the resultant batch—original items less rejected items—need not include details on rejected items. In such case, it is desirable to generate a separate report on the rejected items for use by the mailer to upgrade his processing techniques and procedures.

As described in connection with FIG. 3, the deliverability report will contain information concerning deliverability of the mail in the batch. The report will thus include the number of undeliverables vs. the number of deliverables. The computer then calculates the percentage of undeliverables in the batch, which can be reported as a separate item.

In addition, the parameters of each mail piece's addressability is measured to determine the degree of difficulty in delivering the mail. For example, a mail piece with only a zip code is harder to deliver than if it has a zip plus four code. A mail piece lacking a house address may still be deliverable, but it would consume more effort to do so. If the name of the addressee is misspelled, the mail piece is still deliverable but again with more effort required. Thus, in accordance with this aspect of the invention, the pre-processing not only determines the number of deliverables vs. non-deliverables, but also analyzes the deliverables to determine what percentage will be harder to deliver. This information is also included in the deliverability report.

There are several ways in which this information can be used to improve the efficiency of the system. In its simplest mode, the Postal Service can relate the discount given to the mailer not only on the percentage of deliverables, but also on the percentage of easy deliverables, which are optimally addressed. This will motivate mailers to recheck their mailing lists for accuracy and completeness of addressing.

A second way of using this information is based upon concepts disclosed in the related copending application, Ser. No. 285,145, the contents of which are herein incorporated by reference. In that case, the mailer's computerized user station is connected by way of a two-way communication link to a central data station. This system allows exchange of information between individual mailers with limited resources and a computerized central data station serving many mailers and having available much greater resources. One resource of value is a master database of customer names and addresses, from which each mailer can draw customized customer lists for his own mailings. It is a much simpler task for the centralized facility to maintain up-to-date listings of customers for its mailer-clients. Mailers will have the opportunity, on request, to update their mailing lists based on the central data facility's master list, but implementing this might be expensive and time consuming, and possibly unnecessary if in fact the mailer's list are reasonably up-to-date.

Figure 5:
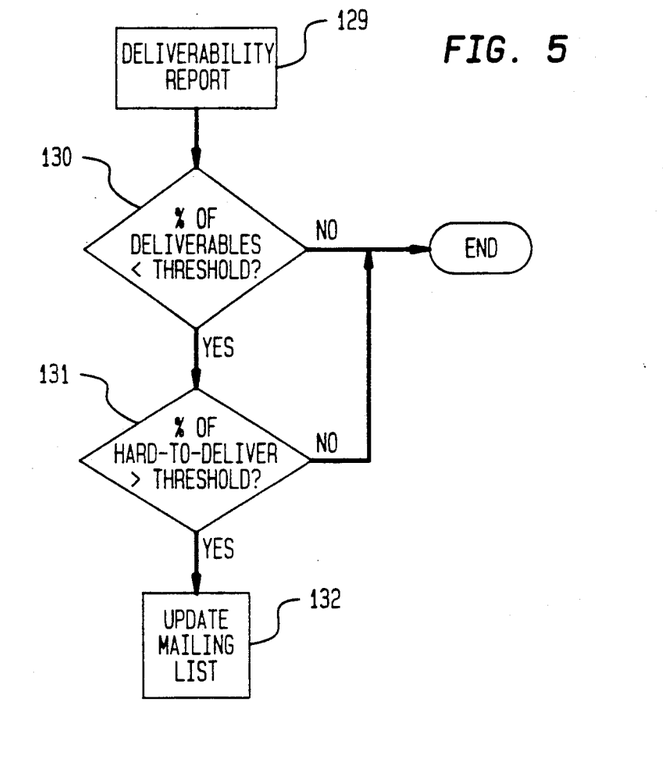
FIGS. 5 and 6 are flow charts showing operation of the system which provides for database updating when certain thresholds are reached.

The additional data collected in accordance with the present invention is an excellent vehicle for indicating to the mailer that it is time to update. This is illustrated in the flow chart of FIG. 5. From the deliverability report 129 data is calculated relating to the percentage of deliverables and hard-to-deliver. A threshold of acceptability is established. This can be determined by Postal Service discounts weighed against cost of updating the mailing list. The computer then compares the actual percentages measured against the thresholds. If the percentage of deliverables falls below the inputted threshold value 130, or if the percentage of hard-to-deliver deliverables exceeds the inputted threshold value 131, then an indication 132 is given to the mailer that it is time to update his mailing list. The mailer can retain the option to do so by any means available to him, or in the preferred embodiment, the central data station can be automatically requested to download its current mailing list to the mailer. This would allow the mailer to certify to the Postal Service that, by reason of this automatic updating process, the percentage of deliverables and easy-to-deliver mail pieces will never fall below certain levels thereby entitling the mailer to additional discounts.

Deliverability often involves aspects besides proper addressing. It is common practice for mailers of envelopes containing many inserts, inserted by automatic inserting machinery, not to bother weighing the stuffed envelope because a computer can maintain a data base of inserts and their weights. Thus, knowing which inserts were included in the envelope, it is a simple matter to calculate the overall weight by addition of the weights of the individual pieces. This works fine, so long as new inserts are not added or the weight of an insert doesn't change due to a change in thickness of the paper stock. If this happens, and the mailer's data base is not immediately updated, then the stuffed envelope weight can exceed the amount for which postage was paid. This could result in loss of discounts for the batch if it were being processed without separate weighing of each mail piece.

Figure 6:
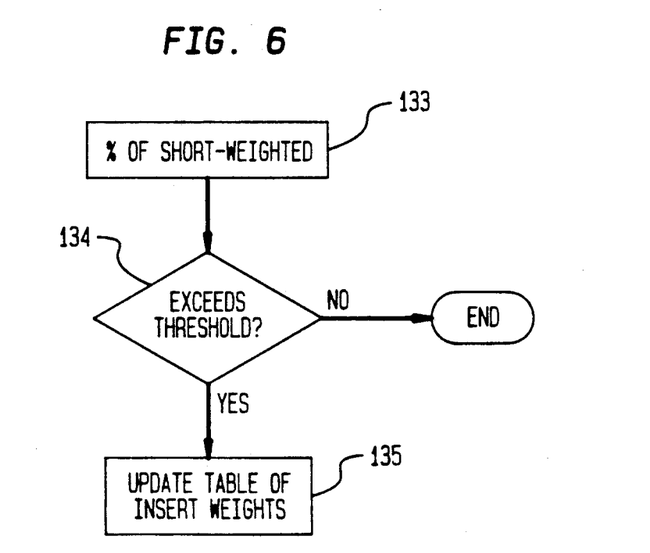

This information is also included in the deliverability report, namely, the percentage of short-weighted mail pieces. This is illustrated in FIG. 6. If the percentage of short-weighted mail pieces 133 exceed a given threshold 134 established by the mailer or the central data facility, then the mailer is given an indication 135 to update its tables of insert weights, which again can be done locally by the mailer or downloaded from the central data facility.

Though the invention has been described in connection with sampling of batch mailings, it is understood that the invention is not limited thereto and will be equally useful in a system which measures the relevant parameters for each individual mail piece.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. In a method for improving the processing of mail wherein batch mailings prepared by a mailer before delivery to a postal system are pre-processed to determine the number of non-deliverable addresses versus deliverable addresses in the batch, said addresses having been printed on each mail piece of the batch from a mailing list of addresses maintained by the mailer, the steps comprising:
   (a) determining the percentage of non-deliverable addresses,
   (b) analyzing the non-deliverable addresses to determine the reasons for non-deliverability, and
   (c) processing the mailing list in accordance with the non-deliverability reasons determined in step (b) to correct those addresses to remove reasons for non-deliverability.

2. In a method for improving the processing of mail wherein batch mailings prepared by a mailer before delivery to a postal system are pre-processed to determine the number of non-deliverable addresses versus deliverable addresses in the batch, said addresses having been printed on each mail piece of the batch from a mailing list of addresses maintained by the mailer, the steps comprising:
   (a) determining the percentage of non-deliverable addresses,
   (b) establishing a threshold percentage of non-deliverable addresses,
   (c) indicating to the mailer when the threshold has been reached, and
   (d) processing the mailing list to reduce the number of non-deliverables.

3. The method of claim 2, wherein step (a) includes the step of determining the degree of difficulty of deliverability of deliverable addresses, and step (a) is carried out by determining at least one of the following parameters of each mail piece in the batch or of sample mail pieces taken from the batch:
   i. incorrect addressee name,
   ii. incorrect address,
   iii. absence of house address,
   iv. absence of zip code,
   v. absence of zip plus four code,
   vi. discrepancy between city/state and zip code,
   vii. incorrect mailing weight,
   viii. incorrect or illegal material content,
   ix. readability, and
   x. size.

4. The method of claim 3, wherein all of items i–x are determined.

5. The method of claim 3, wherein the mailing list is processed by downloading an updated mailing list from a central data facility.

6. The method of claim 3, wherein a report is generated which includes the percentage of non-deliverables of the batch.

7. The method of claim 6, wherein the report includes the degree of difficulty of deliverables.

8. In a method for improving the processing of mail wherein batch mailings prepared by a mailer before delivery to a postal system are pre-processed to determine the number of non-deliverable addresses versus deliverable addresses in the batch, said addresses having been printed on each mail piece of the batch from a mailing list database stored in said computer of addresses maintained by the mailer, the steps comprising:
   (a) determining the percentage of non-deliverable addresses,
   (b) analyzing the non-deliverable addresses to determine the reasons for non-deliverability, and
   (c) processing said mailing list database in accordance with the non-deliverability reasons determined in step (b) to correct those addresses to remove reasons for non-deliverability.

9. In a system for improving the processing of mail wherein batch mailings prepared by a mailer before delivery to a postal system are pre-processed to determine the number of non-deliverable addresses versus deliverable addresses in the batch, said addresses having been printed on each mail piece of the batch from a mailing list of addresses maintained by the mailer, the improvement comprising:
   (a) means for determining the percentage of non-deliverable addresses,
   (b) means for analyzing the non-deliverable addresses to determine the reasons for non-deliverability, and
   (c) means for processing the mailing list in accordance with the non-deliverability reasons determined by element (b) to correct those addresses to remove reasons for non-deliverability.

10. In a system for improving the processing of mail wherein batch mailings prepared by a mailer before delivery to a postal system are pre-processed to determine the number of non-deliverable addresses versus deliverable addresses in the batch, said addresses having been printed on each mail piece of the batch from a computer-stored database comprising a mailing list of addresses maintained by the mailer, the improvement comprising:
   (a) means for determining the percentage of non-deliverable addresses,
   (b) means for establishing a threshold percentage of non-deliverable addresses,
   (c) means for indicating to the mailer when the threshold has been reached, and
   (d) means for processing the mailing list database to reduce the number of non-deliverables.

11. The system of claim 10, wherein element (a) includes means for determining the degree of difficulty of deliverability of deliverable addresses, and means for determining at least one of the following parameters of each mail piece in the batch or of sample mail pieces taken from the batch:
   i. incorrect addressee name,
   ii. incorrect address,
   iii. absence of house address,
   iv. absence of zip code,
   v. absence of zip plus four code,
   vi. discrepancy between city/state and zip code,
   vii. incorrect mailing weight,
   viii. incorrect or illegal material content,
   ix. readability,
   x. size.

* * * * *